(12) United States Patent
Haruta

(10) Patent No.: US 10,560,603 B2
(45) Date of Patent: Feb. 11, 2020

(54) IMAGE PROCESSING APPARATUS AND IMAGE PROCESSING METHOD

(71) Applicant: CANON KABUSHIKI KAISHA, Tokyo (JP)

(72) Inventor: Kenichirou Haruta, Nagareyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/985,924

(22) Filed: May 22, 2018

(65) Prior Publication Data

US 2018/0359388 A1 Dec. 13, 2018

(30) Foreign Application Priority Data

Jun. 8, 2017 (JP) .................................. 2017-113491

(51) Int. Cl.
*H04N 1/405* (2006.01)

(52) U.S. Cl.
CPC ......... *H04N 1/4053* (2013.01); *H04N 1/4057* (2013.01)

(58) Field of Classification Search
CPC ....... H04N 1/4053; H04N 1/52; H04N 1/4057
See application file for complete search history.

(56) References Cited

FOREIGN PATENT DOCUMENTS

| CN | 103369195 A | 10/2013 |
|----|-------------|---------|
| CN | 104303226 A | 1/2015 |
| CN | 106454006 A | 2/2017 |
| JP | H10145615 A | 5/1998 |
| JP | H10166664 A | 6/1998 |

OTHER PUBLICATIONS

Notice of the First Office Action issued by the National Intellectual Property Administration of the People's Republic of China dated Dec. 4, 2019 in corresponding CN Patent Application No. 201810586715.8, with English translation.

*Primary Examiner* — Christopher Wait
(74) *Attorney, Agent, or Firm* — Carter, DeLuca & Farrell LLP

(57) ABSTRACT

In the case of performing halftone processing using a threshold value matrix, the memory capacity for storing the threshold value matrix is reduced without reducing the image quality of an output image. An image processing apparatus that generates a halftone image by performing halftone processing using a threshold value matrix for each piece of image data of a plurality of color planes corresponding to color materials used for printing processing, and the number of bits of a threshold value in a first threshold value matrix for a color plane whose visibility is relatively low of the plurality of color planes is smaller than the number of bits of a threshold value in a second threshold value matrix for a color plane whose visibility is relatively high of the plurality of color planes.

11 Claims, 12 Drawing Sheets

IMAGE PROCESSING APPARATUS AND IMAGE PROCESSING METHOD

BACKGROUND OF THE INVENTION

Field of the Invention

The present invention relates to a halftone processing technique using a threshold value matrix.

Description of the Related Art

In recent years, an image forming apparatus has prevailed widely, such as a digital copy machine, a printer, and a facsimile, for forming an image on a printing medium, such as paper, by using various methods, such as an electrophotographic method, an ink jet method, and a thermal transfer method. Generally, in many cases, the gradation number that can be output in the image forming apparatus such as this is smaller than the gradation number of input image data. Because of this, quantization processing (halftone processing) is performed for the input image data. As the halftone processing, a conditional determination method of determining a threshold value by taking into consideration the peripheral density of a pixel of interest, represented by the error diffusion method and the like, and an independent determination method of determining a threshold value by only a pixel of interest, represented by the ordered dither method and the sub matrix method, are known.

Here, the halftone processing by the independent determination method is explained. First, the ordered dither method is a method of performing quantization by preparing, for example, a threshold value matrix of N×M pixels (M and N are integers) arranged on a two-dimensional plane as one unit of toner level reproduction and by comparing the threshold value of the threshold value matrix and the pixel value of an input multivalued image for each pixel. The halftone processing by the independent determination method such as this is simple in processing compared to the conditional determination method and effective in the case where high-speed processing is required. However, in order to reproduce a large gradation number, a large-sized threshold value matrix corresponding to the gradation number is necessary, and therefore, a large memory capacity for storing the threshold value matrix is necessary. Further, in the case where a different threshold value matrix is prepared for each color of C (cyan), M (magenta), Y (yellow), and K (black), a larger memory capacity is necessary.

In such circumstances, a method of storing a threshold value matrix in a ROM by dividing the threshold value matrix into two pieces of information, that is, basic pattern information and arrangement pattern information, has been proposed (for example, see Japanese Patent Laid-Open No. H10-166664 (1998)). Specifically, an arithmetic operation based on the basic pattern information and the arrangement pattern information stored in the ROM within an image forming apparatus is performed in a controller unit and a threshold value matrix generated by the arithmetic operation is stored in an internal memory of the controller unit.

As described above, with the method of Japanese Patent Laid-Open No. H10-166664 (1998), a large-sized threshold value matrix generated based on the basic pattern information and the arrangement pattern information is stored in the internal memory of the controller unit. Because of this, the internal memory of the controller unit still requires a large capacity.

An object of the present invention is to reduce a memory capacity for storing a threshold value matrix without lowering the image quality of an output image in the case where halftone processing using the threshold value matrix is performed.

SUMMARY OF THE INVENTION

The image processing apparatus according to the present invention is an image processing apparatus that generates a halftone image by performing halftone processing using a threshold value matrix for each piece of image data of a plurality of color planes corresponding to color materials used for printing processing, and the number of bits of a threshold value in a first threshold value matrix for a color plane whose visibility is relatively low of the plurality of color planes is smaller than the number of bits of a threshold value in a second threshold value matrix for a color plane whose visibility is relatively high of the plurality of color planes.

Further features of the present invention will become apparent from the following description of exemplary embodiments with reference to the attached drawings.

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment

In the present embodiment, an aspect is explained in which the circuit scale is reduced by changing the number of bits of a threshold value in a threshold value matrix in accordance with visual recognizability for each color plane.

Figure 1:
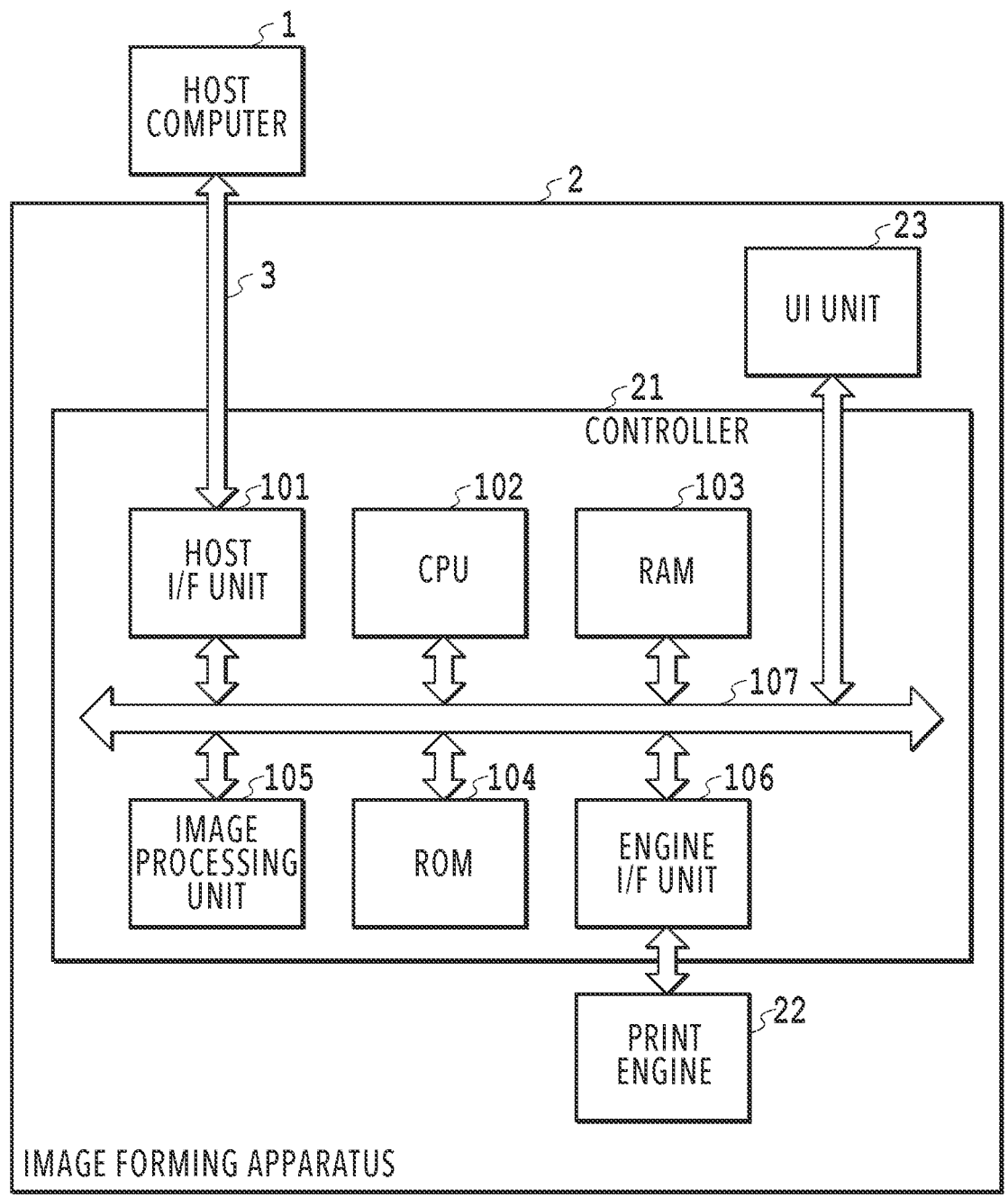
FIG. 1 is a diagram showing an example of a configuration of a printing system.

FIG. 1 is a diagram showing an example of a configuration of a printing system according to the present embodiment. The printing system includes a host computer 1 and an image forming apparatus 2 and both are connected to each other by a network 3. The image forming apparatus 2 includes a controller 21, a print engine 22, and a user interface (UI) unit 23. The UI unit 23 has switches for a user to perform various operations, an LED display device, and so on.

The host computer 1 is a computer, such as a general PC (Personal Computer) and a WS (Work Station). In the host computer 1, software, such as a document creation application and a printer driver, is installed. Then, an electronic document created, for example, in the document creation application is transmitted to the image forming apparatus 2 via the network 3 as PDL (Page Description Language) data by the printer driver. Here, the network is, for example, a LAN (Local Area Network).

The PDL data sent from the host computer 1 is received by the controller 21 of the image forming apparatus 2. The controller 21 converts the received PDL data into print data that the print engine 22 can process and outputs the print data to the print engine 22. The print engine 22 performs printing processing on a printing medium, such as paper, by a predetermined method, such as an electrophotographic method and an ink jet method, based on the print data output from the controller 21. The UI unit 23 is operated by a user and used to select a function to use and to give various instructions. The UI unit 23 includes a keyboard on which various keys, such as a start key, a stop key, and a ten-key, and buttons are arranged, and the like, in addition to including a liquid crystal display having a touch panel function.

Next, details of the controller 21 are explained. The controller 21 has a host I/F unit 101, a CPU 102, a RAM 103, a ROM 104, an image processing unit 105, an engine I/F unit 106, and an internal bus 107. The host I/F unit 101 is a communication interface that performs transmission and reception of data with the host computer 1, such as reception of the above-described PDL data. The PDL data received by the host I/F unit 101 is sent to the image processing unit 105. The CPU 102 performs image processing, to be described layer, which is performed by the controller 21, as well as controlling the entire image forming apparatus 2 by using programs and data stored in the RAM 103 and the ROM 104. The RAM 103 is a work area used by the CPU 102 at the time of performing various kinds of processing. The ROM 104 stores programs and data for causing the CPU 102 to perform image processing, to be described later, setting data of the controller 21, and so on.

The image processing unit 105 performs image processing for print for PDL data in accordance with the setting from the CPU 102 and generates print data that can be processed in the print engine 22. Specifically, by rasterizing the received PDL data, the image processing unit 105 generates image data (RGB image data) having color components of RGB for each pixel. RGB image data is bitmap data in which each pixel has multiple values (for example, ten bits (1,024 tone levels)) for each of the RGB color components. Then, the image processing unit 105 generates print data by performing predetermined image processing for the generated RGB image data. Details of the image processing unit 105 will be described later. The engine I/F unit 106 is an interface that transmits the print data generated by the image processing unit 105 to the print engine 22. The internal bus 107 is a system bus that connects each of the above-described units.

[Image Processing Unit]

Figure 2:
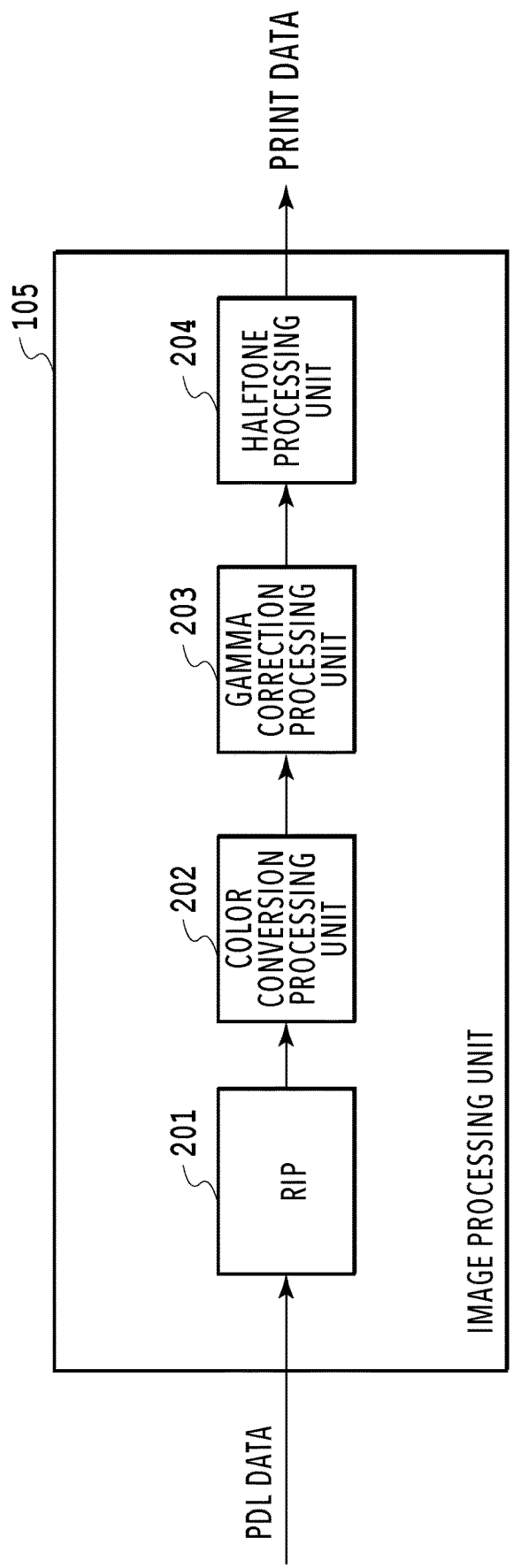
FIG. 2 is a block diagram showing an internal configuration of an image processing unit.

Next, details of the image processing unit 105 are explained. FIG. 2 is a block diagram showing an internal configuration of the image processing unit 105. As shown in FIG. 2, the image processing unit 105 includes a RIP 201, a color conversion processing unit 202, a gamma correction processing unit 203, and a halftone processing unit 204.

The RIP (Raster Image Processor) 201 generates, for example, multivalued image data in the RGB color space by performing rasterize processing for input PDL data. The color conversion processing unit 202 performs color conversion processing to convert the RGB color space in the generated multivalued image data into a color space (for example, CMYK) corresponding to color materials used in the print engine 22. By the color conversion processing, image data in the CMYK color space having a density value (also called "tone level value", "signal value") of multiple values for each pixel is generated. The generated image data in the CMYK color space is stored in a buffer (not shown schematically) within the color conversion processing unit 202.

The gamma correction processing unit 203 corrects the density value of the image data in the CMYK color space by using a one-dimensional LUT so that the density characteristics at the time of image data (halftone data) that is generated in the halftone processing unit 204, to be described later, being transferred onto printing paper become desired characteristics. In the present embodiment, as an example, a linear-shaped one-dimensional LUT is used. The LUT is a table in which an input value is an output value as it is. However, it may also be possible for the CPU 102 to rewrite the one-dimensional LUT in accordance with a change in the state of the print engine 22. The image data in the CMYK color space after gamma correction is input to the halftone processing unit 204. The halftone processing unit 204 generates halftone data made up of halftone (dots) by performing quantization processing for the input image data in the CMYK color space and outputs the halftone data to the engine I/F unit 106 as print data.

[About Visual Recognizability for Each Color Plane]

Figure 3:
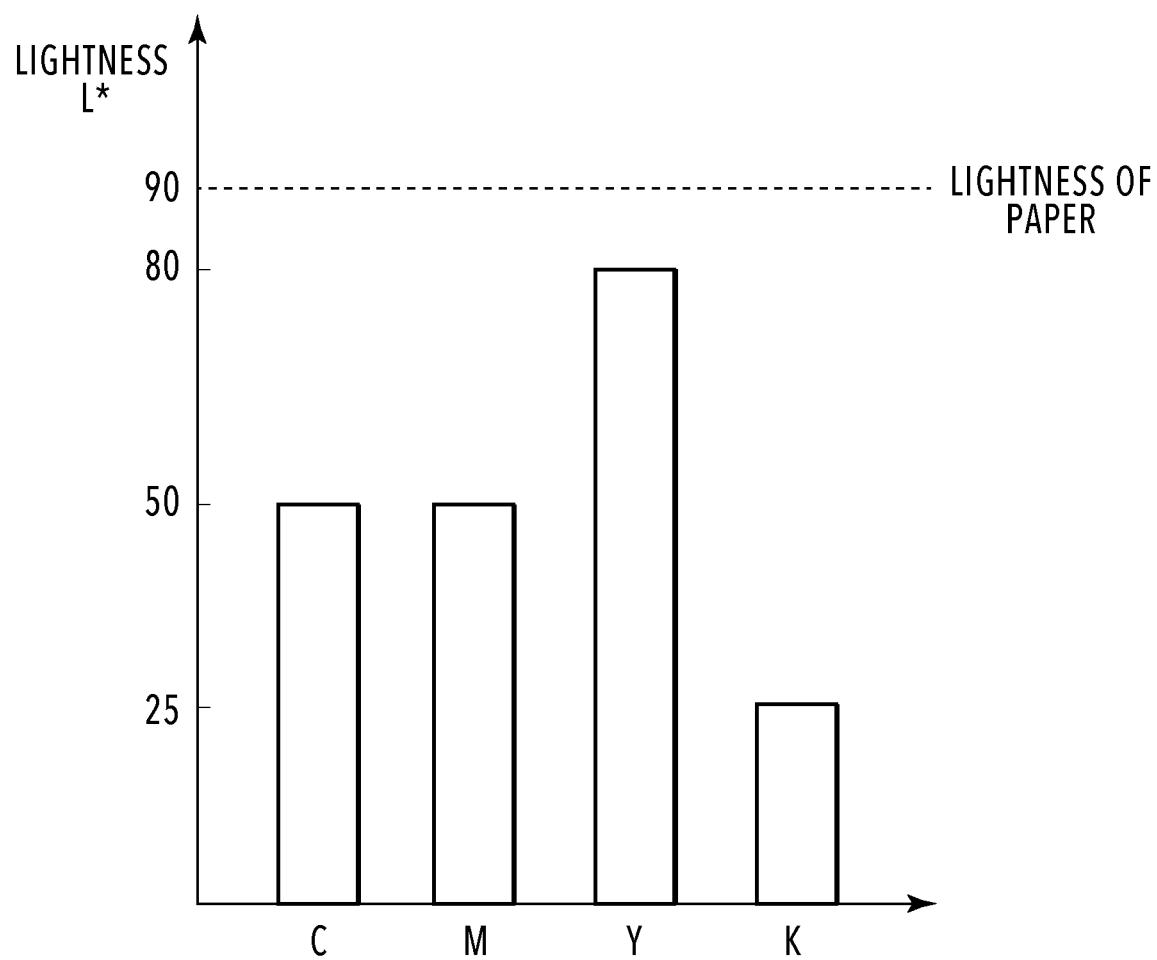
FIG. 3 is a graph showing lightness for each color plane.

Here, the human visual characteristics (visibility) and the gradation number necessary for each color plane are explained with reference to FIG. 3. FIG. 3 is a graph showing lightness for each color plane of CMYK. In FIG. 3, a broken line indicating a lightness value of "90" indicates lightness of paper. In the present embodiment, it is assumed that lightness is a numerical value uniform for a visual response.

In the human retina, a rod that responds to light and darkness and a cone that responds to color exist. The human eyesight responds sensitively to a difference in the lightness component and not so much responds to a difference in tint. Then, the gradation properties of a single color refer to the tone levels capable of representing from the state where nothing is printed (lightness of paper) to the state where all the pixels are filled with a certain color plane (lightness of a certain plane). Consequently, in the case of a black plane (hereinafter, K plane), it is necessary to smoothly represent tone levels in the range of a lightness difference of "65", which is obtained by subtracting a lightness value of "25" of the K plane from the lightness value "90" of paper. Further, in the case of a yellow plane (hereinafter, Y plane), it is necessary to smoothly represent tone levels in the range of a lightness difference of "10", which is obtained by subtracting a lightness value of "80" of the Y plane from the lightness value "90" of paper. In the case of a cyan plane (hereinafter, C plane) and a magenta plane (hereinafter, M plane), it is necessary to smoothly represent tone levels in the range of a lightness difference of "40", which is obtained by subtracting a lightness value of "50" in the C plane and the M plane from the lightness value "90" of paper.

Here, it is assumed that 1,024 tone levels are necessary to smoothly represent tone levels for the K plane without causing a pseudo contour. At this time, for the K plane, the lightness difference "65" is represented by 1,024 tone levels. Consequently, the gradation number for a lightness difference of 1 is 1,024/65≈15.7 16. Based on this, the lightness difference of the Y plane is "10", and therefore, the necessary gradation number is 10×16=160. Further, the lightness difference of both the C plane and the M plane is "40", and therefore, the necessary gradation number is 40×16=640.

From the above, the number of bits of the threshold value held in the threshold value matrix for the K plane needs to be ten (0000000000 to 1111111111=0 to 1,023) in order to secure 1,024 tone levels. Similarly, the number of bits of the threshold value held in the threshold matrix for the C plane and the M plane needs to be ten in order to secure 640 tone levels. Then, the number of bits of the threshold value held in the threshold value matrix for the Y plane needs to be only eight (00000000 to 11111111=0 to 255) because it is only necessary to secure 160 tone levels. With the above in mind, in the present embodiment, in each threshold value matrix for the M plane, the C plane, and the K plane whose visibility is relatively high, each threshold value is held by ten bits and in the threshold value matrix for the Y plane whose visibility is relatively low, each threshold value is held by eight bits.

In this respect, conventionally, the number of bits of the threshold value is determined in accordance with the maximum value of the necessary gradation number. The threshold value matrix is applied repeatedly in a tiled manner with a period of M pixels in the horizontal direction and N pixels in the vertical direction of image data. Consequently, with the conventional method, the amount of memory necessary to hold the threshold value of the threshold value matrix for the Y plane is also M×N×10 (bits), which is the size (M×N) of the threshold value matrix multiplied by the number of bits of the threshold value to be held. However, in the present embodiment, the threshold value in the threshold value matrix for the Y plane requires only eight bits, and therefore, the amount of memory necessary to hold the threshold value is M×N×8 (bits). Consequently, it is made possible to reduce the amount of memory necessary to hold the threshold value of the threshold value matrix for the Y plane by 20% compared to the conventional method.

In the above-described example, the gradation number necessary for the K plane is set to 1,024, but the gradation number may be 4,096 or 65,536. For example, in the case where the gradation number necessary for the K plane is set to 4,096, the lightness difference "65" is represented by 4,096 tone levels, and therefore, the gradation number for the lightness difference "1" is 4,096/65≈63. Based on this, the lightness difference of the Y plane is "10", and therefore, the necessary gradation number is 10×63=630. Further, the lightness difference of both the C plane and the M plane is "40", and therefore, the necessary gradation number is 40×63=2,520. From the above, the number of bits of the threshold value held in the threshold value matrix for the K plane is 12 in order to secure 4,096 tone levels. Similarly, the number of bits of the threshold value held in the threshold value matrix for the C plane and the M plane is 12 in order to secure 2,520 tone levels. Then, the number of bits of the threshold value held in the threshold value matrix for the Y plane is only ten because it is only necessary to secure 630 tone levels. Consequently, in this case, it is made possible to reduce the amount of memory necessary to hold the threshold value of the threshold value matrix for the Y plane by about 17%.

In the above-described example, the lightness value of the K plane is set to "25", the lightness value of the Y plane is set to "80", and the lightness value of the C plane and the M plane is set to "50", but it is needless to say that the lightness of each color plane changes according to the color material and for example, in the case of the electrophotographic method, the lightness changes according to the component, such as dyestuff used for toner. Further, the lightness value of paper is set to "90", but this may also change according to the kind of paper.

[Details of Halftone Processing Unit 204]

Figure 4:
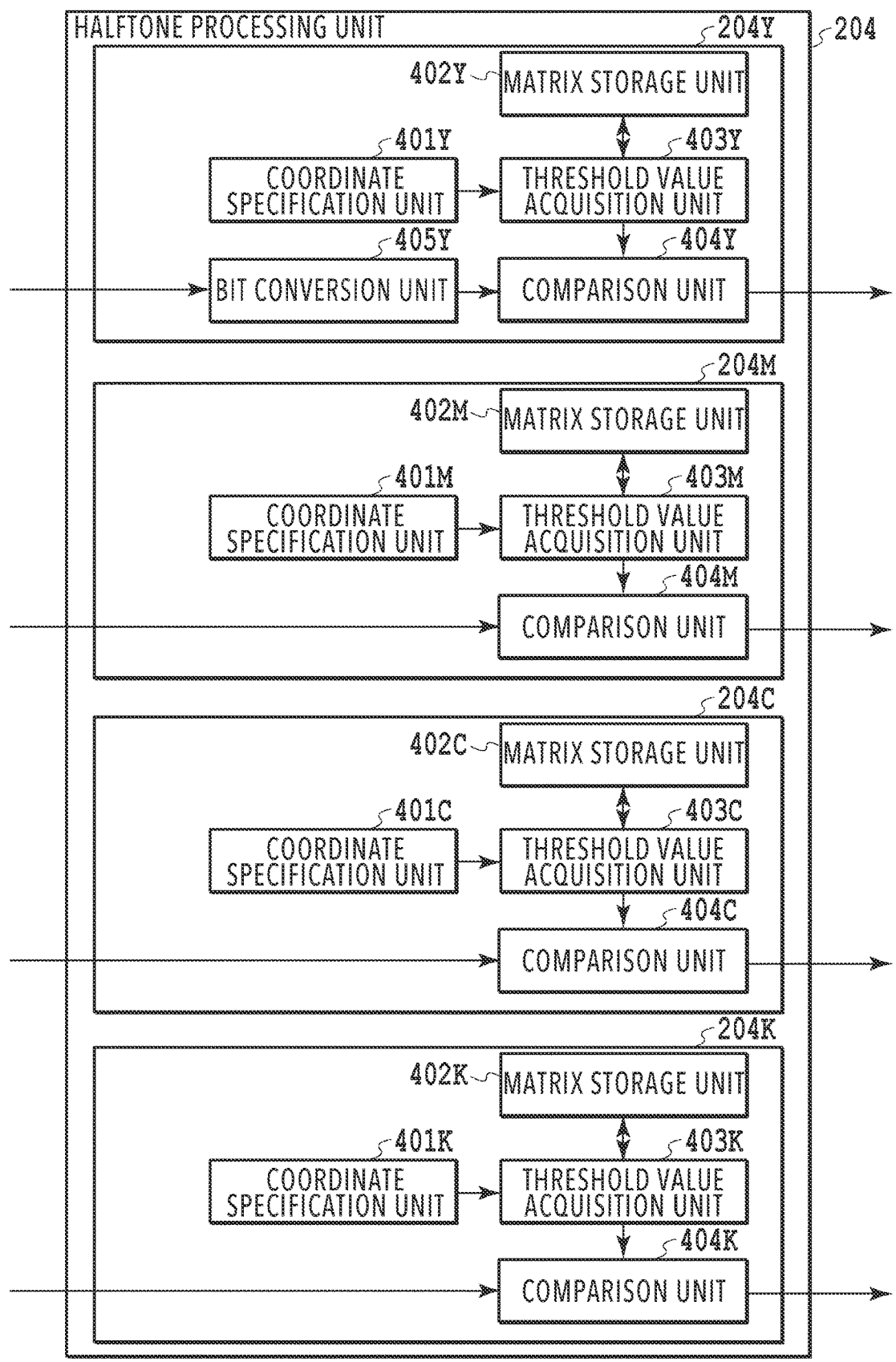
FIG. 4 is a block diagram showing an internal configuration of a halftone processing unit according to a first embodiment.
Figure 5:
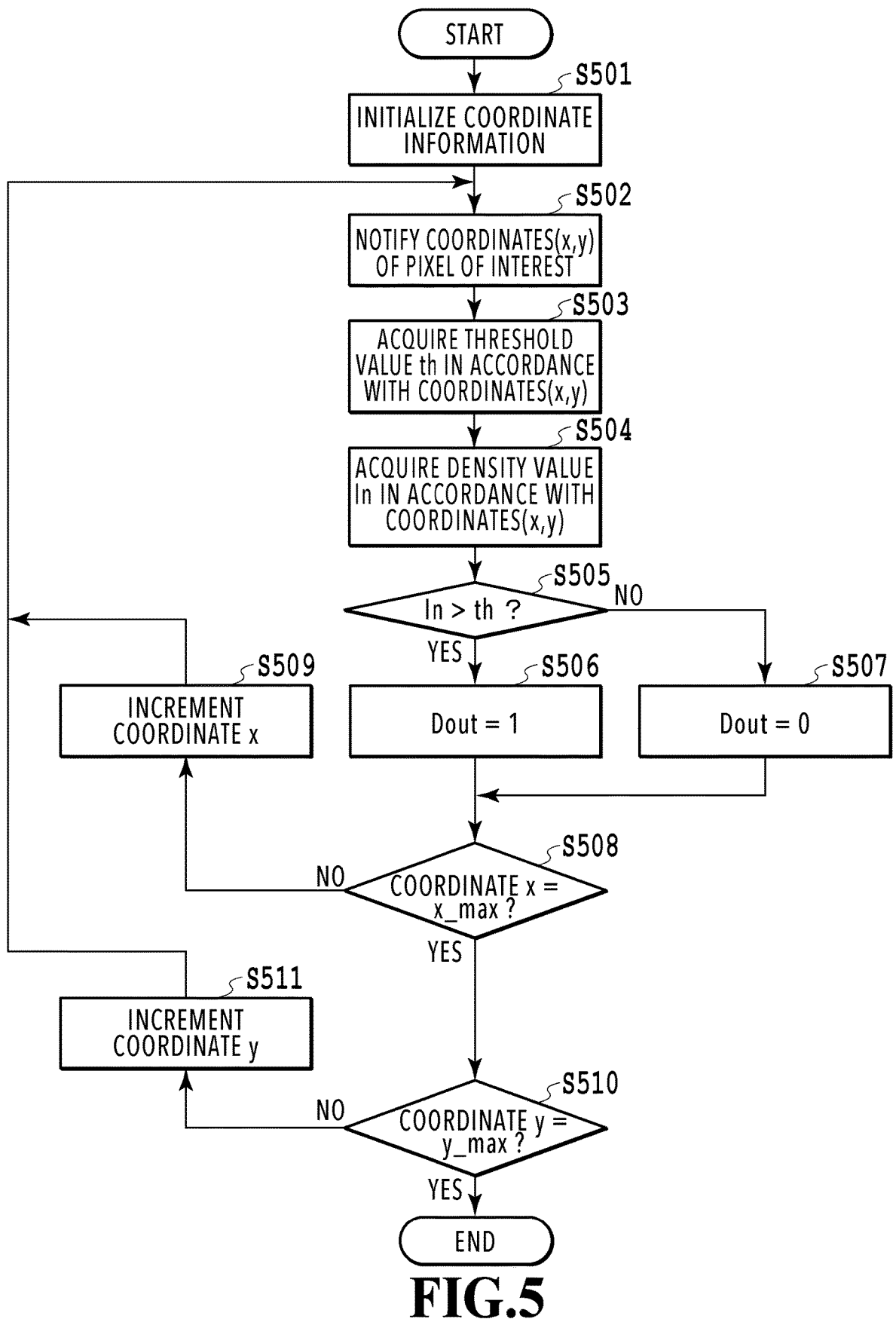
FIG. 5 is a flowchart showing a flow of halftone processing according to the first embodiment.

Next, details of the halftone processing unit 204 in the present embodiment are explained. Here, explanation is given on the assumption that the print engine 22 is a print engine of the type that forms an image on a printing medium, such as paper, by using four kinds of color material (toner or ink) of CMYK. FIG. 4 is a block diagram showing an internal configuration of the halftone processing unit 204 according to the present embodiment. As shown in FIG. 4, four kinds of image processing path 204Y, 204M, 204C, and 204K corresponding to each color plane of CMYK exist. To the first image processing path, image data of the Y plane is input, to the second image processing path, image data of the M plane is input, to the third image processing path, image data of the C plane is input, and to the fourth image processing path, image data of the K plane is input, respectively. Each of the image processing paths 204Y to 204K has a coordinate specification unit 401, a matrix storage unit 402, a threshold value acquisition unit 403, and a comparison unit 404. Then, the image processing path 204Y further has a bit conversion unit 405. In each image processing path with such a configuration, halftone processing is performed for input image data for each color plane of CMYK. FIG. 5 is a flowchart showing a flow of halftone processing according to the present embodiment. In the case where image data in the CMYK color space, for which gamma correction has been performed, is input to the halftone processing unit 204, the series of processing shown in the flow in FIG. 5 is performed in each image processing path corresponding to each color plane. In the following flow, the number of pixels in the main scanning direction in input image data is represented as x_max and the number of pixels in the sub scanning direction is represented as y_max.

At step 501, the coordinate specification unit 401 initializes coordinate information (x, y) specifying the pixel position in image data of a target color plane. Here, (x, y) is set to (0, 0). At step 502 that follows, the coordinate specification unit 401 notifies the threshold value acquisition unit 403 of the coordinate information (x, y) indicating the position of a pixel of interest. For example, in the case where the top-left corner of the input image data is taken to be the origin and the topmost-leftmost pixel is taken to be a pixel of interest, the threshold value acquisition unit 403 is notified of (0, 0) as the coordinate information (x, y).

Figure 6A:
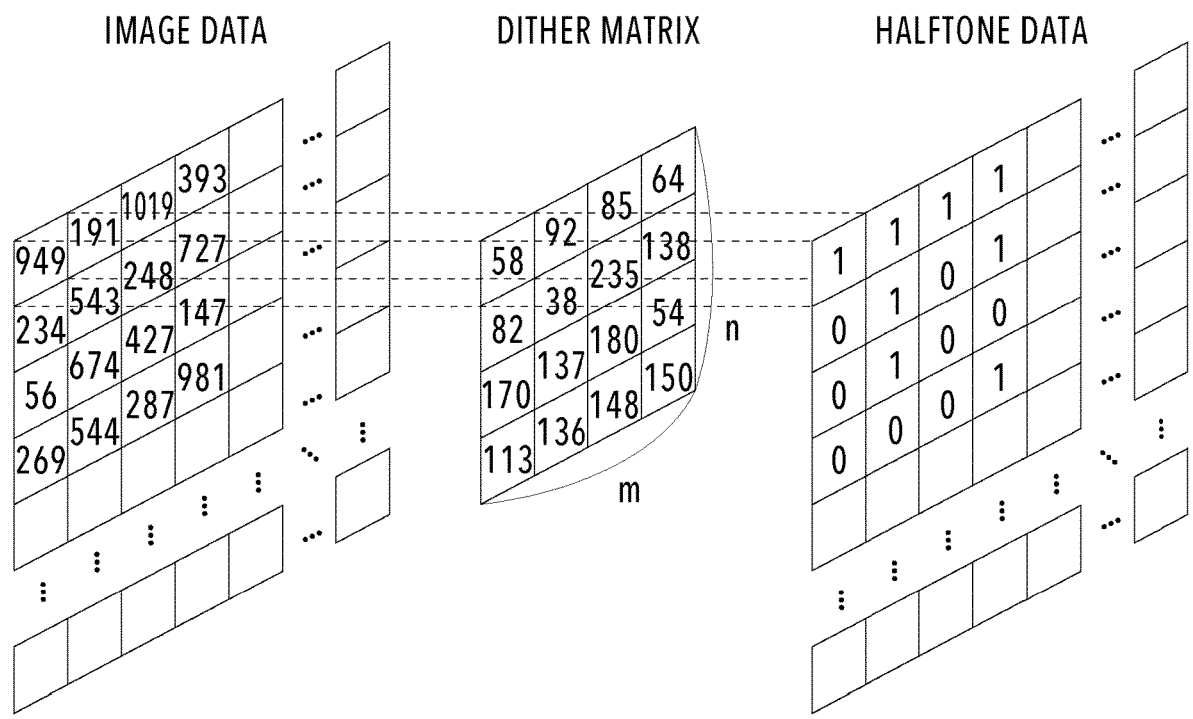
FIG. 6A and FIG. 6B are diagrams explaining an outline of halftone processing to quantize an image into a multivalued image of two values according to the first embodiment.
Figure 6B:
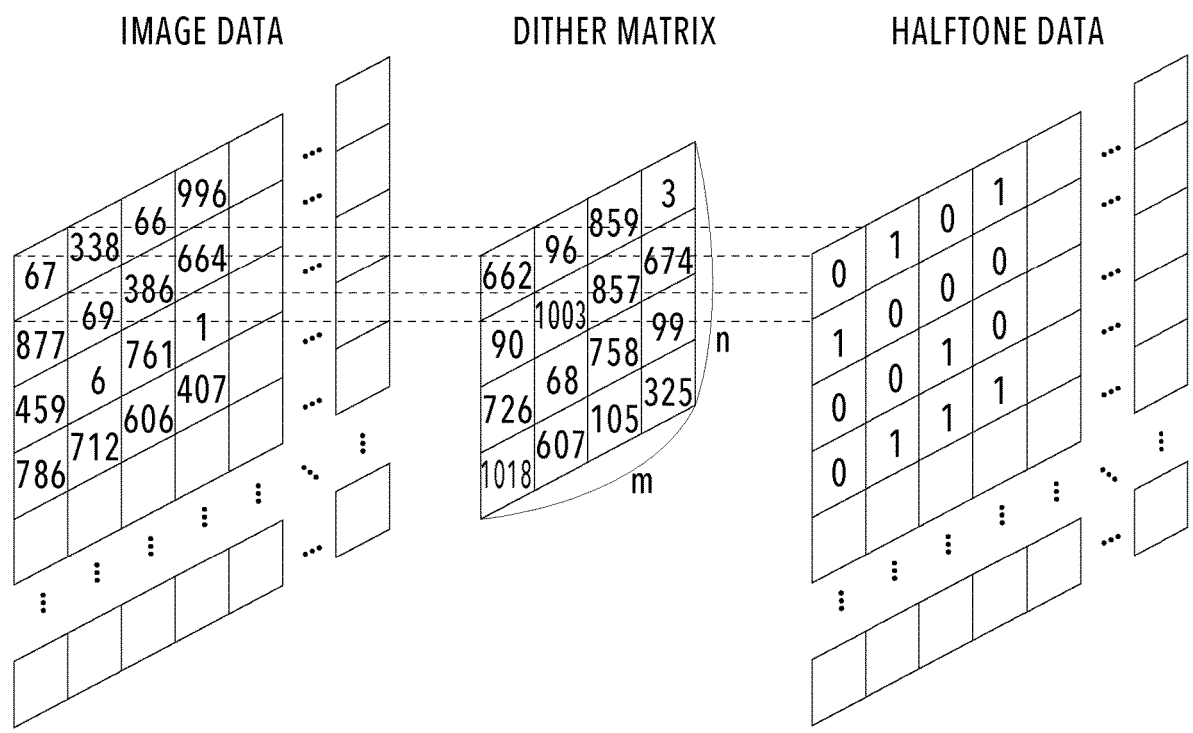

At step 503, the threshold value acquisition unit 403 acquires a threshold value th corresponding to the pixel of interest from the matrix storage unit 402 in accordance with the notified coordinate information. As described above, by the coordinate specification unit 401 notifying the threshold value acquisition unit 403 of the coordinate information (x, y) on the pixel of interest, the threshold value corresponding to the position of the pixel of interest is read by the threshold value acquisition unit 403. Then, the acquired threshold value th is output to the comparison unit 404. FIG. 6A and FIG. 6B are diagrams explaining an outline of the halftone processing to quantize an image into a multivalued image of two values. FIG. 6A corresponds to the image processing path 204Y for the Y plane and FIG. 6B corresponds to the image processing path for the color plane other than the Y plane. Here, in the case where the topmost-leftmost pixel of the input image data is the pixel of interest, in the image processing path 204Y for the Y plane, "58" is acquired as the threshold value th and output to the comparison unit 404Y. Further, in each of the image processing paths 204C, 204M, and 204K for the C plane, the M plane, and the K plane, "662" is acquired as the threshold value th and output to the comparison units 404C, 404M, and 404K, respectively.

At step 504, the comparison unit 404 acquires a density value In (x, y) of the pixel of interest. Here, in the case of the Y plane, the number of bits of the threshold value held in the threshold value matrix within the matrix storage unit 402 is eight. Consequently, in the bit conversion unit 405Y, bit conversion is performed for the 10-bit density value of the pixel of interest and the higher eight bits thereof are input to the comparison unit 404Y. In the example in FIG. 6A described above, in the case where the topmost-leftmost pixel is the pixel of interest, the density value In (0, 0) is "949" and this is represented as "1110110101" by ten bits. The higher eight bits thereof are "11101101", and therefore, "237" corresponding thereto is output to the comparison unit 404Y from the bit conversion unit 405Y. Further, in the example in FIG. 6B, in the case where the topmost-leftmost pixel is the pixel of interest, as the density value In (0, 0), "67" is input to the comparison unit 404 as it is.

At step 505, the comparison unit 404 compares the density value In (x, y) and the threshold value th. In the case where the density value In (x, y) is larger than the threshold value th, the processing advances to step 506. On the other hand, in the case where the density value In (x, y) is smaller than the threshold value th, the processing advances to step 507.

At step 506, an output value Dout is determined to be "1" and output. Further, at step 507, the output value Dout is determined to be "0" and output. In the example in FIG. 6A described above, the density value In (0, 0) in the case where the topmost-leftmost pixel is the pixel of interest is "949" and the threshold value th is "58". In this case, the density value In is larger than the threshold value th, and therefore, "1" is the output value. Further, in the example in FIG. 6B, the density value In (0, 0) in the case where the topmost-leftmost pixel is the pixel of interest is "67" and the threshold value th is "662". In this case, the density value In is smaller than the threshold value th, and therefore, "0" is the output value.

At step 508, the coordinate specification unit 401 determines whether the coordinate x in the main scanning direction has reached x_max (coincides with x_max). In the case where the results of the determination indicate that the coordinate x in the main scanning direction has not reached x_max, the processing advances to step 509. At step 509, the coordinate specification unit 401 increments (+1) the coordinate x and advances the pixel of interest in the main scanning direction by one pixel. After the coordinate x is incremented, the processing returns to step 502 and the processing for the next pixel of interest is continued. In the case where the results of the determination indicate that the coordinate x in the main scanning direction has reached x_max, the processing advances to step 510.

At step 510, the coordinate specification unit 401 determines whether the coordinate y in the sub scanning direction has reached y_max (coincides with y_max). In the case where the results of the determination indicate that the coordinate y in the sub scanning direction has not reached y_max, the processing advances to step 511. At step 511, the coordinate specification unit 401 resets the coordinate x (sets x to 0) and then increments (+1) the coordinate y and advances the pixel of interest in the sub scanning direction by one pixel. After the coordinate y is incremented, the processing returns to step 502 and the processing for the next pixel of interest is continued. In the case where the results of the determination indicate that the coordinate y in the sub scanning direction has reached y_max, it is meant that all the pixels of the input image data have been processed, and therefore, this processing is terminated. The above is the contents of the halftone processing that is performed in each image processing path of the present embodiment.

According to the present embodiment, the number of bits of the threshold value in the threshold value matrix for the color plane whose visibility is relatively low is made smaller than the number of bits of the threshold value in the threshold value matrix for the other color planes. Due to this, it is made possible to reduce the circuit scale by reducing the memory capacity of the matrix storage unit 402 configured to store the threshold value matrix, for example, for the Y plane whose visual recognizability is low while maintaining the necessary gradation properties.

Second Embodiment

In the first embodiment, explanation is given by taking the case as an example where the print engine 22 performs image formation by using the four color materials corresponding to each color component of CMYK. Next, the case is explained as a second embodiment where the print engine 22 performs image formation by using a total of six kinds of color material, that is, light cyan (LC) and light magenta (LM) are added to CMYK. Explanation of the contents in common to those of the first embodiment is omitted and in the following, different points are explained mainly.

[About Visual Recognizability for Each Plane]

Figure 7:
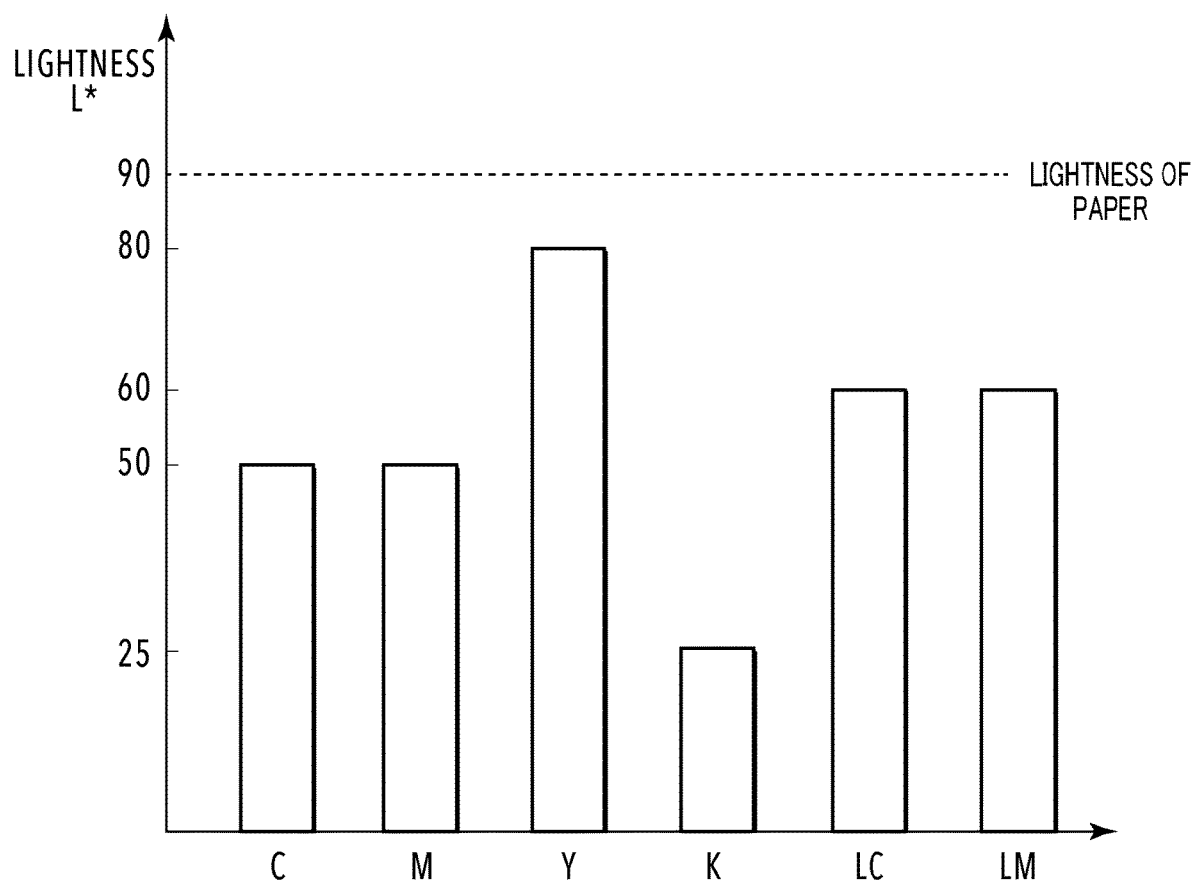
FIG. 7 is a graph showing lightness for each color plane.

Here, the human visual characteristics (visibility) and the gradation number necessary for each color plane are explained with reference to FIG. 7. FIG. 7 is a graph representing lightness for each color plane of CMYK to which LC and LM are added. The basic items, such as the lightness of paper, are the same as those in FIG. 3 of the first embodiment. As described previously, it is necessary to smoothly represent tone levels in the range of the lightness difference "65" in the case of the K plane, in the range of the lightness difference "10" in the case of the Y plane, and in the range of the lightness difference "40" in the case of the C plane and the M plane, respectively. Then, in the case of a light cyan plane (hereinafter, LC plane) and a light magenta plane (hereinafter, LM plane), the lightness value of paper is "90" and the lightness value of the LC plane and the LM plane is "60", and therefore, it is necessary to smoothly represent tone levels in the range of a lightness difference of "30", which is obtained by subtracting the lightness value of each color plane from the lightness value of paper.

Then, in the case where it is assumed that 1,024 tone levels are necessary to smoothly represent tone levels without causing a pseudo contour for the K plane as in the first embodiment, the lightness difference "65" is represented by 1,024 tone levels, and therefore, the gradation number for the lightness difference "1" is "16". Based on this, the gradation number necessary for the Y plane whose lightness difference is "10" is 160 and the gradation number necessary for the C plane and the M plane whose lightness difference is "40" is 640. Then, in the case of the LC plane and the LM plane, the lightness difference is "30", and therefore, the necessary gradation number is 480. As described previously, in this case, the number of bits of the threshold value held in each threshold value matrix for the K plane, the C plane, and the M plane is ten and number of bits of the threshold value held in the threshold value matrix for the Y plane needs to be only eight. Then, for the LC plane and the LM plane that need to secure 480 tone levels, the number of bits of the threshold value held in the threshold value matrix needs to be only nine. That is, in the case of the present embodiment, compared to the conventional case, it is made possible to reduce the amount of memory necessary to hold the threshold value in the threshold value matrix for the Y plane by 20% and the amount of memory necessary to hold the threshold value in the threshold value matrix for the LC plane and the LM plane by 10%, respectively.

[Details of Halftone Processing Unit 204]

Figure 8:
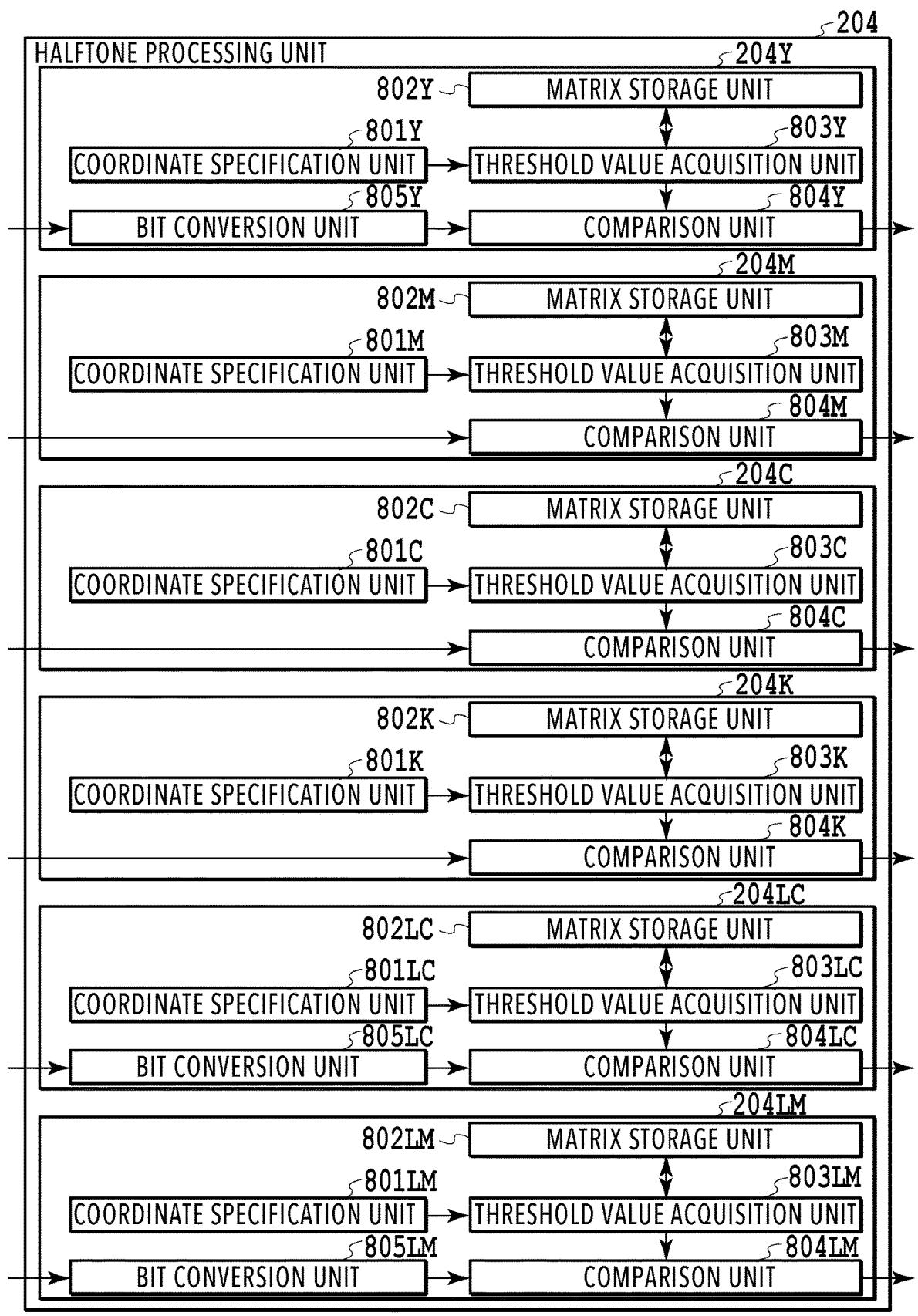
FIG. 8 is a block diagram showing an internal configuration of a halftone processing unit according to a second embodiment.

Next, details of the halftone processing unit 204 in the present embodiment are explained. FIG. 8 is a block diagram showing an internal configuration of the halftone processing unit 204 according to the present embodiment. As shown in FIG. 8, six kinds of image processing path 204Y, 204M, 204C, 204K, 204LC, and 204LM corresponding to each color plane exist. As in the first embodiment, to the first image processing path, image data of the Y plane is input, to the second image processing path, image data of the M plane is input, to the third image processing path, image data of the C plane is input, and to the fourth image processing path, image data of the K plane is input, respectively. Then, to the fifth image processing path, image data of the LC plane is input and to the sixth image processing path, image data of the LM plane is input, respectively. Each of the image processing paths 204Y to 204LM of the present embodiment has a coordinate specification unit 801, a matrix storage unit 802, a threshold value acquisition unit 803, and a comparison unit 804. Then, the image processing paths 204Y, 204LC, and 204LM further have a bit conversion unit 805. In each image processing path with such a configuration, the halftone processing shown in FIG. 5 of the first embodiment is performed for input image data.

Figure 9A:
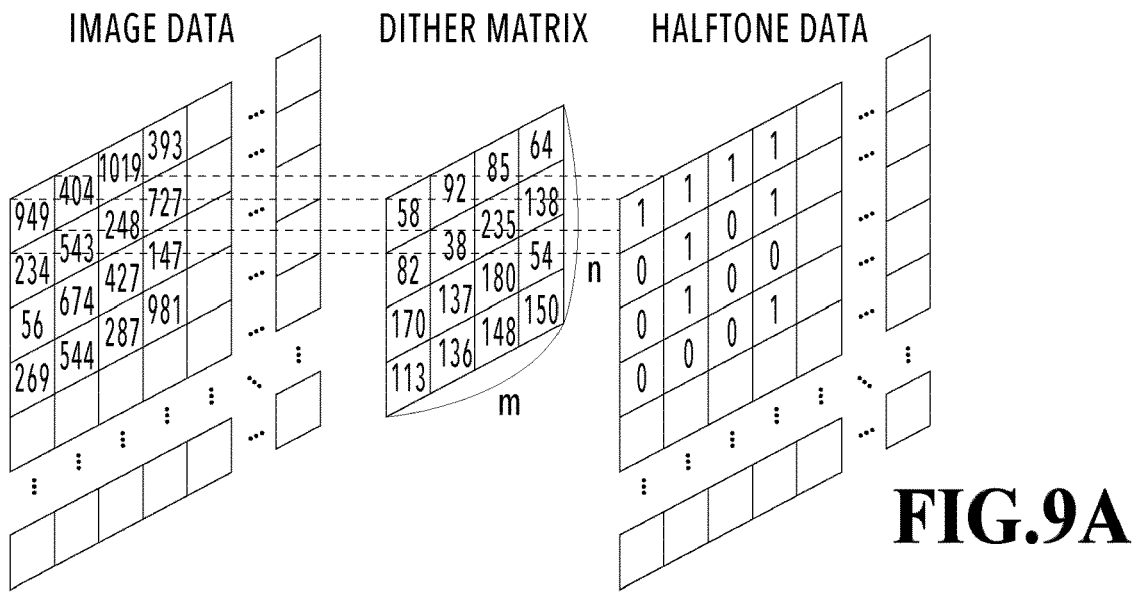
FIG. 9A to FIG. 9C are diagrams explaining an outline of halftone processing to quantize an image into a multivalued image of two values according to the second embodiment.
Figure 9B:
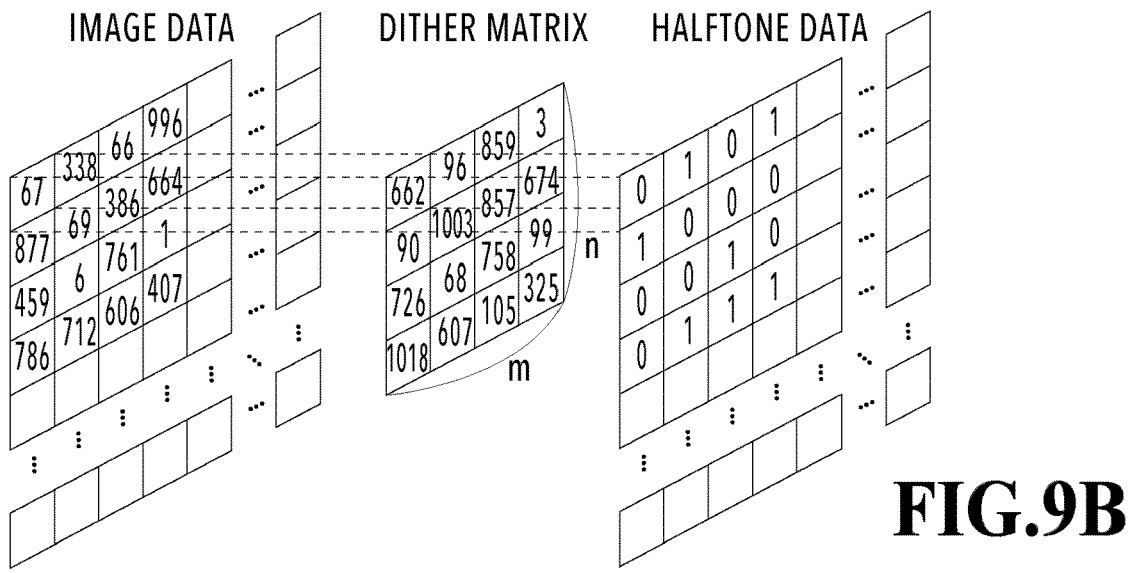
Figure 9C:
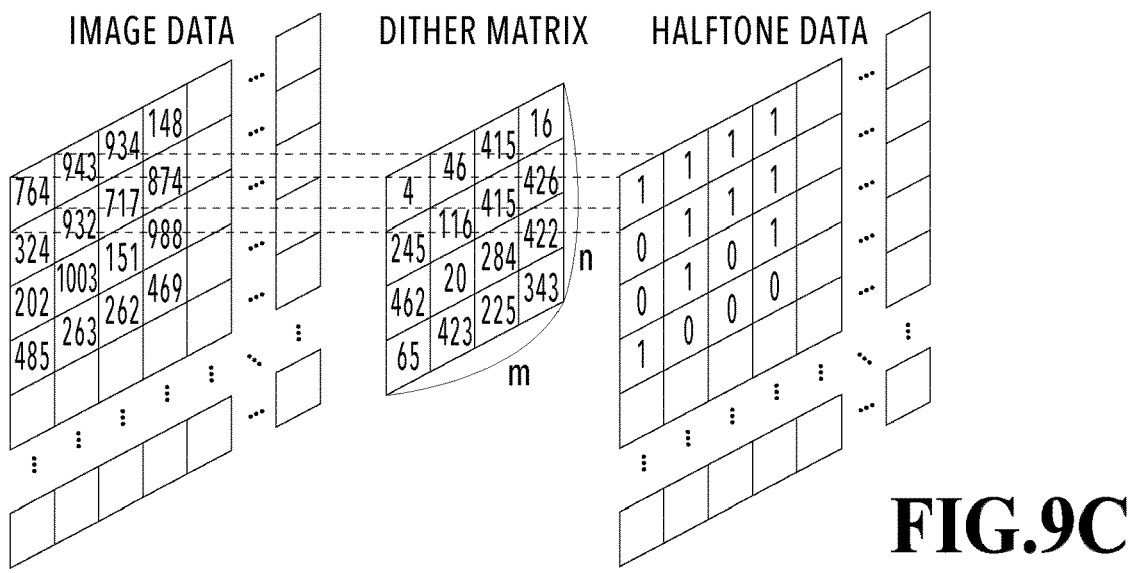

FIG. 9A to FIG. 9C are diagrams explaining an outline of halftone processing to quantize an image into a multivalued image of two values. FIG. 9A corresponds to the image processing path 204Y for the Y plane, FIG. 9B corresponds to the image processing paths 204C, 204M, and 204K for the C plane, the M plane, and the K plane, and FIG. 9C corresponds to the image processing paths 204LC and 204LM for the LC plane and the LM plane. In the case where the threshold value acquisition unit 803 is notified of the coordinate information (x, y) specifying the position of a pixel of interest by the coordinate specification unit 801 (steps 501 and 502), the threshold value acquisition unit 803 acquires the threshold value th corresponding to the pixel of interest from the matrix storage unit 802 in accordance with the notified coordinate information. In the case where the topmost-leftmost pixel of the input image data is the pixel of interest, in the image processing path 204Y for the Y plane, "58" is acquired as the threshold value th and output to the comparison unit 804. Further, in each of the image processing paths for the C plane, the M plane, and the K plane, "662" is acquired as the threshold value th and output to the comparison units 804C, 804M, and 804K, respectively. Then, each of the image processing paths 204LC and 204LM for the LC plane and the LM plane, "4" is acquired as the threshold value th and output to the comparison units 804LC and 804LM, respectively.

Following the above, the density value In (x, y) of the pixel of interest is acquired by the comparison unit 804 (step 504). At this time, the density value of the pixel of interest in accordance with the number of bits of the threshold value held in the threshold value matrix within the matrix storage unit 802 is input to the comparison unit 804. In the case where the topmost-leftmost pixel in the example in FIG. 9A corresponding to the Y plane is the pixel of interest, the density value In (0, 0) is "949", and therefore, 949>>2="237" corresponding to the higher eight bits thereof is input to the comparison unit 804Y by the bit conversion unit 805Y. Further, in the case where the topmost-leftmost pixel in the example in FIG. 9C corresponding to the LC plane and the LM plane is the pixel of interest, the density value In (0, 0) is "764". Consequently, 764>>1="382" corresponding to the higher nine bits thereof is input to the comparison units 804LC and 804LM, respectively, by the bit conversion units 805LC and 805LM. In the case where the topmost-leftmost pixel in the example in FIG. 9B corresponding to the C plane, the M plane, and the K plane is the pixel of interest, as the density value In (0, 0), "67" is input to the comparison units 804C, 804M, and 804K, respectively, as it is.

Then, in the comparison unit 804, the density value In (x, y) and the threshold value th are compared (step 505). In the case where the results of the comparison indicate that the density value In (x, y) is larger, the output value Dout is determined to be "1" (step 506) and in the case where the density value In (x, y) is smaller, the output value Dout is determined to be "0" (step 507). In the example of the Y plane described above (FIG. 9A), the density value In (0, 0) is "949" and the threshold value th is "58" and the density value In is larger, and therefore, "1" is the output value. Further, in the example of the LC plane and the LM plane (FIG. 9C), the density value In (0, 0) is "382" and the threshold value th is "4" and the density value In is larger, and therefore, "1" is the output value. Then, in the example of the C plane, the M plane, and the K plane (FIG. 9B), the density value In (0, 0) is "67" and the threshold value th is "662" and the density value In is smaller, and therefore, "0" is the output value.

The processing after step 508 is the same as that of the first embodiment, and therefore, explanation is omitted. The above is the contents of the halftone processing that is performed in each image processing path of the present embodiment.

As above, by making the number of bits of the threshold value in the threshold value matrix for the color plane whose visual recognizability is low smaller than the number of bits of the threshold value in the threshold value matrix for the other color planes, it is made possible to reduce the memory capacity of the matrix storage unit 402 while maintaining the necessary gradation properties. Due to this, it is made possible to reduce the circuit scale.

Third Embodiment

In the first and second embodiments, the aspect is explained in which the number of bits of each threshold value held in the threshold value matrix is changed in accordance with the visual recognizability of the color plane in the case where the halftone processing to output a multivalued image represented by two values of "0" and "1" is performed by a comparison with one threshold value for one pixel. Next, an aspect is explained as a third embodiment in which the number of threshold values to be compared for one pixel is changed in accordance with the color plane in the case where halftone processing to output a multivalued image represented by three or more values is performed by a comparison with a plurality of different threshold values for one pixel. Explanation of the contents in common to those of the first and second embodiments is omitted and in the following, different points are explained mainly.

In the present embodiment, it is assumed that the print engine 22 is capable of processing image data of three or more values (here, four bits=16 tone levels) for one pixel. Consequently, in the halftone processing unit 204, quantization to generate a multivalued image of 16 tone levels is performed. In the quantization to generate a multivalued image of three or more values, the number of threshold value matrixes in accordance with the number of bits of the multiple values is used. At this time, the number of threshold value matrixes (number of levels) to be prepared is the number obtained by subtracting "1" from the gradation number. Consequently, in the case of generating a multivalued image of 16 tone levels, the threshold value matrix whose number of levels is 15 (Level_1 to Level_15) is prepared. Then, in each image processing path, processing to compare the density value of the pixel of interest with the corresponding threshold value in the threshold value matrix of each level is repeated and a 4-bit value (one of values "0000" to "1111") obtained by adding up the comparison results is taken to be an output value.

As described previously, the threshold value matrix is applied repeatedly in a tiled manner with a period of M pixels in the horizontal direction and N pixels in the vertical direction of input image data. Consequently, in the case of a threshold value matrix whose one level is, for example, a size of M=10 and N=8, the threshold value matrix can have a total of 80×15=1,200 threshold values for Level_1 to Level_15. The number 1,200 is a sufficient number in the case where the K plane whose lightness difference is "65" is represented by 1,024 tone levels. Based on this, the gradation number necessary for the Y plane whose lightness difference is "10" is 160, and therefore, in the case of a threshold value matrix whose size is M=10 and N=8, the threshold value matrix can have 240 threshold values for Level_1 to Level_3, and therefore, sufficiently capable of representation. Here, the number of bits of the threshold value held in each threshold value matrix is ten and the range of values the threshold value can take is "0 to 1,023".

Summarizing the above, while 15 threshold value matrixes are used for the K plane, the C plane, and the M plane, respectively, three threshold value matrixes are used for the Y plane. This means that the gradation number that can be represented for one pixel is small only for the Y plane compared to those of the other color planes. However, as described previously, the visual recognizability of the Y plane is low, and therefore, even in the case where the gradation number for one pixel is reduced, this does not lead to conspicuous image quality deterioration.

Originally, it is desirable to prepare the same number of threshold value matrixes for each color plane in accordance with the gradation number the print engine 22 can process. In this case, as a configuration for representing the Y plane by 160 tone levels, the number of levels is set to 15, the same as the other color planes, and the size of the threshold value matrix is reduced to a size sufficiently capable of representation thereof (in the above-described example, M=4, N=3 (because 160/15=10.66)). It is possible to suppress the circuit scale also by changing the size of the threshold value matrix in accordance with the necessary gradation number as described above. However, in the case where the size of the threshold value matrix is reduced, the degree of freedom of screen ruling and angle of a halftone dot that can be represented will be lost. In this case, moire between color planes occurs and there is a possibility that image quality deterioration is caused. Consequently, in the present embodiment, an attempt to reduce the circuit scale is made by making the size of the threshold value matrix the same for all the color planes and then by reducing the number of threshold value matrixes for the color plane (here, Y plane) whose visual recognizability is low than those of the other color planes. Specifically, the amount of memory necessary to store the threshold value matrix for the Y plane in the matrix storage unit is originally M×N×15 (levels)×10 (bits) =150×M×N (bits), which is obtained by multiplying the size of the threshold value matrix by the number of levels and the number of bits of the threshold value. However, in the case of the present embodiment, the number of levels of the threshold value matrix for the Y plane is three, and therefore, the necessary amount of memory is only M×N×3 (levels)× 10 (bits)=30×M×N (bits). That is, it is made possible to reduce the amount of memory necessary to store the threshold value matrix for the Y plane by 80%.

In the present embodiment, the size of the threshold value matrix is made the same for all the color planes, but it may also be possible to conversely make large the size of the threshold value matrix for the color plane whose visual recognizability is low. For example, in the case where the size of the threshold value matrix for the K plane is M=10 and N=8, the size of the threshold value matrix for the Y plane is set to M=10 and N=10, and so on. The number of levels of the threshold value matrix for the Y plane is small compared to those of the other color planes, and therefore, even in the case where the size of the threshold value matrix is made larger than those of the other color planes, it is possible to obtain a certain reduction effect of the amount of memory. Further, by making large the size of the threshold value matrix for the color plane whose visual recognizability is low, such an effect that the degree of freedom of the halftone dot that can be selected in the color plane is improved is also obtained.

[Details of Halftone Processing Unit 204]

Figure 10:
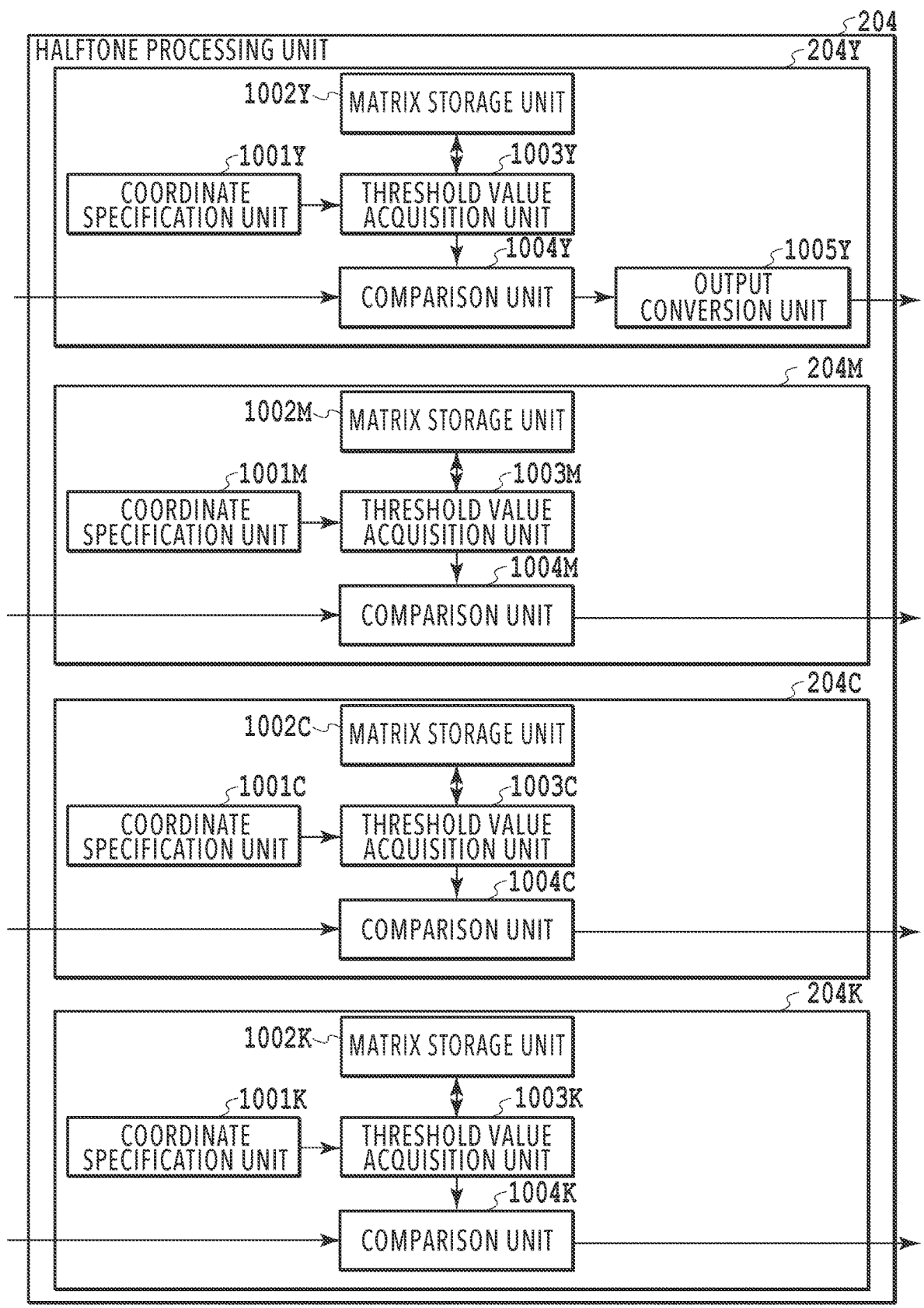
FIG. 10 is a block diagram showing an internal configuration of a halftone processing unit according to a third embodiment.
Figure 11:
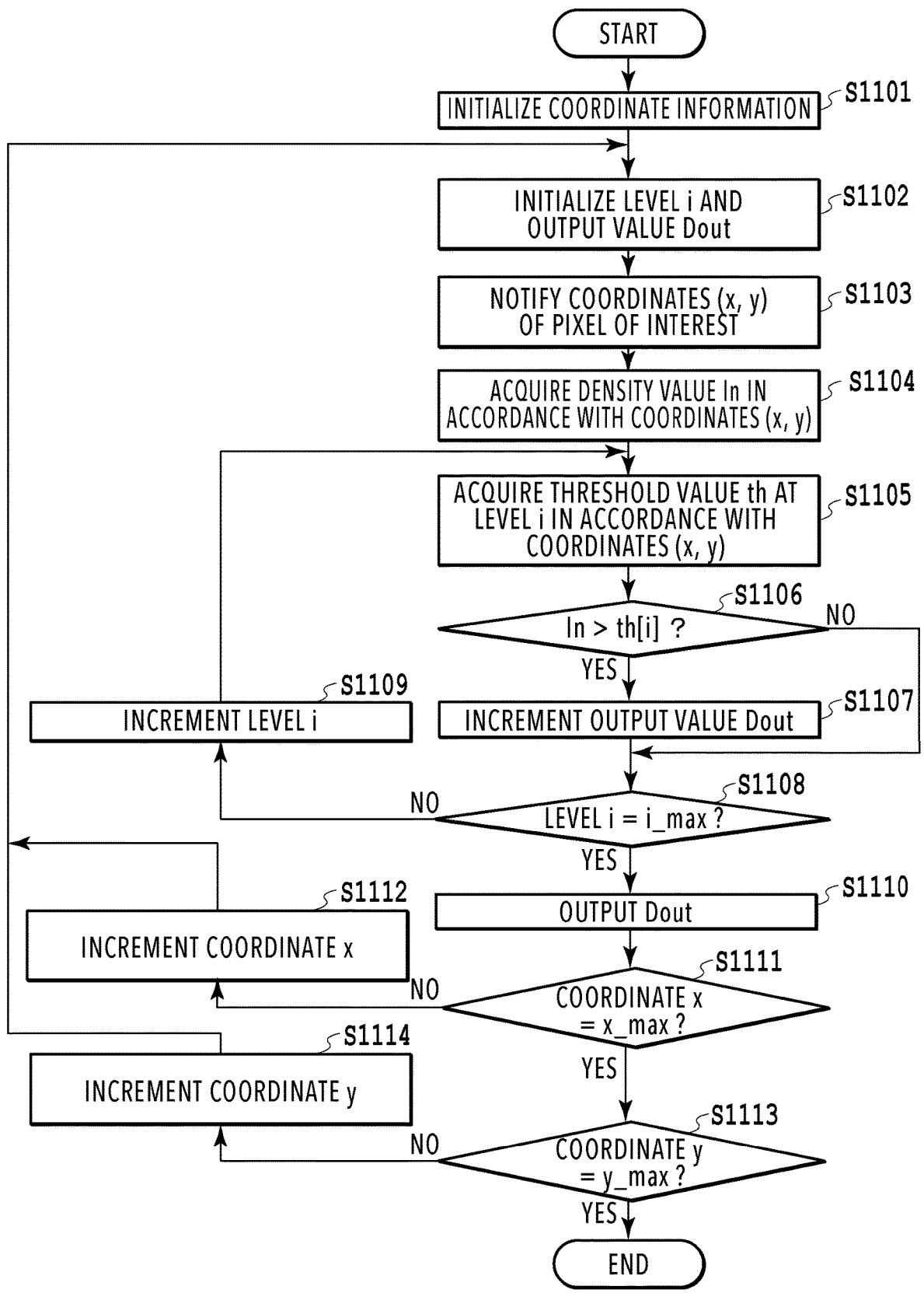
FIG. 11 is a flowchart showing a flow of halftone processing according to the third embodiment.

Next, details of the halftone processing 204 in the present embodiment are explained. FIG. 10 is a block diagram showing an internal configuration of the halftone processing unit 204 according to the present embodiment. As in FIG. 4 of the first embodiment, the four kinds of image processing path 204Y, 204M, 204C, and 204K corresponding to each color plane exist. To the first image processing path, image data of the Y plane is input, to the second image processing path, image data of the M plane is input, to the third image processing path, image data of the C plane is input, and to the fourth image processing path, image data of the K plane is input, respectively. Each of the image processing paths 204Y to 204K has a coordinate specification unit 1001, a matrix storage unit 1002, a threshold value acquisition unit 1003, and a comparison unit 1004. Then, the image processing path 204Y further has an output conversion unit 1005Y. In each image processing path with such a configuration, halftone processing is performed for input image data. FIG. 11 is a flowchart showing a flow of halftone processing according to the present embodiment. In the case where image data of each color plane of CMYK for which gamma correction has been performed is input to the halftone processing unit 204, the series of processing shown in the flow in FIG. 11 is performed in each corresponding image processing path.

At step 1101, the coordinate specification unit 1001 initializes the coordinate information (x, y) specifying the pixel position in the input image data. Here, (x, y) is set to (0, 0). At step 1102 that follows, the comparison unit 1004 initializes a variable i specifying the level of a threshold value matrix and the output value Dout. Here, i is set to 1 and Dout is set to 0. In the present embodiment, a maximum value i_max of the variable i is "3" in the case of the image processing path 204Y and "15" in the case of the other image processing paths 204C, 204M, and 204K.

Figure 12A:
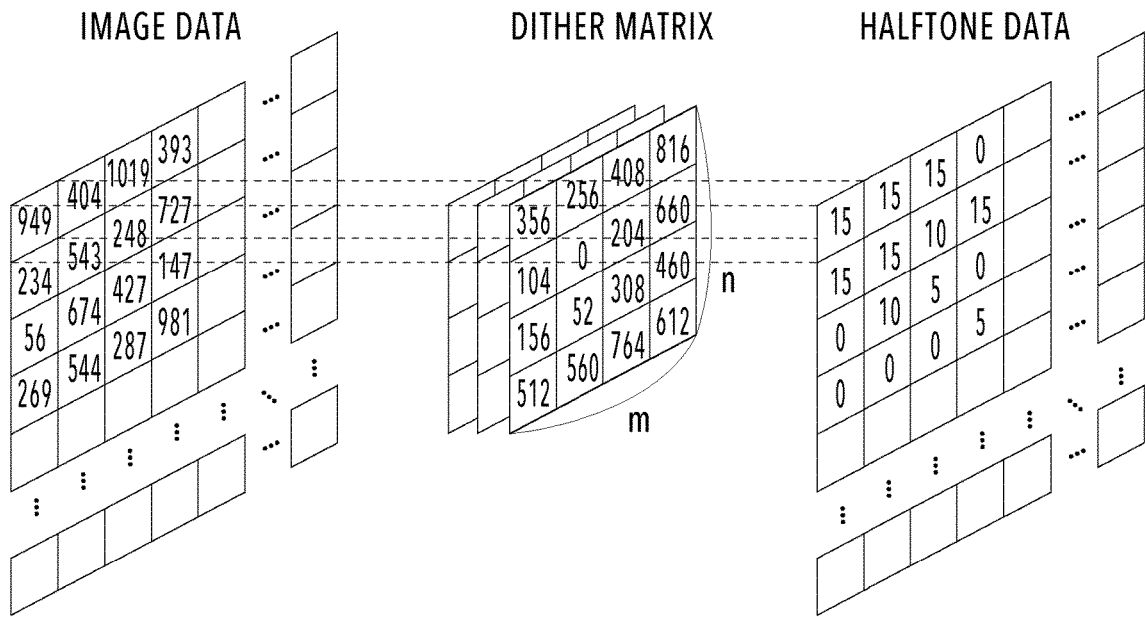
FIG. 12A and FIG. 12B are diagrams explaining an outline of halftone processing to generate a multivalued image of 16 values.
Figure 12B:
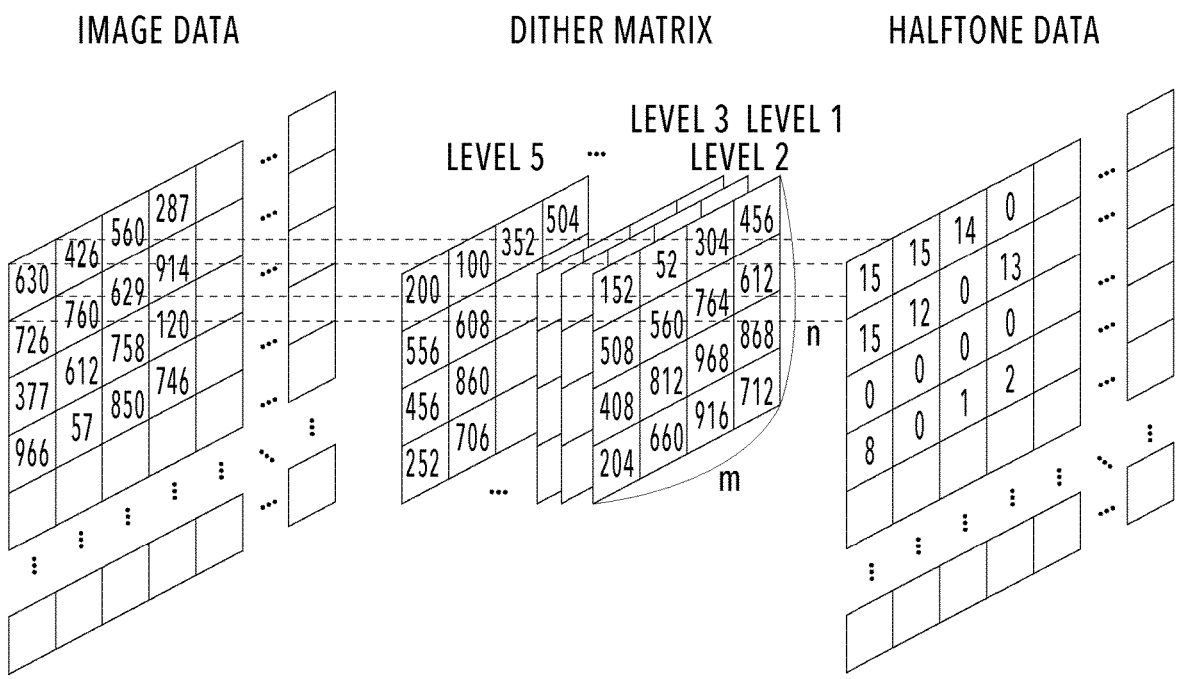

At step 1103, the coordinate specification unit 1001 notifies the threshold value acquisition unit 1003 of the coordinate information (x, y) indicating the position of the pixel of interest. For example, in the case where the top-left corner of the input image data is taken to be the origin and the topmost-leftmost pixel is taken to be the pixel of interest, the threshold value acquisition unit 1003 is notified of (0, 0) as the coordinate information (x, y). At step 1104 that follows, the comparison unit 1004 acquires the density value In (x, y) of the pixel of interest. FIG. 12A and FIG. 12B are diagrams explaining an outline of halftone processing to generate a multivalued image of 16 values. FIG. 12A corresponds to the image processing path 204Y for the Y plane and FIG. 12B corresponds to the image processing path for the color plane other than the Y plane. Here, in the case where the topmost-leftmost pixel of the input image data is the pixel of interest, in the example in FIG. 12A, "949" is acquired as the density value In (0, 0). Further, in the example in FIG. 12B, "630" is acquired as the density value In (0, 0).

At step 1105, the threshold value acquisition unit 1003 acquires a threshold value th [i] corresponding to the pixel of interest from the matrix storage unit 1002 based on the coordinate information notified at step 1103 and the variable i specifying the level of the threshold value matrix. In the examples in FIG. 12A and FIG. 12B described above, in the case where the topmost-leftmost pixel is the pixel of interest and i=1, in the image processing path 204Y for the Y plane, "356" is acquired as the threshold value th [i] and output to the comparison unit 1004Y. Further, in each of the image processing paths 204C, 204M, and 204K for the C plane, the M plane, and the K plane, "152" is acquired as the threshold value th [i] and output to the comparison units 1004C, 1004M, and 1004K, respectively.

At step 1106, the comparison unit 1004 compares the density value In (x, y) and the threshold value th [i]. In the case where the density value In (x, y) is larger than the threshold value th [i], the processing advances to step 1107. At step 1107, the value of the output value Dout is incremented (+1). On the other hand, in the case where the density value In (x, y) is smaller than the threshold value th [i], the processing advances to step 1108. At step 1108, whether the variable i specifying the level of the threshold value matrix has reached (coincides with) i_max is determined. In the case where the variable i has not reached i_max, the processing advances to step 1109. At step 1109, the comparison unit 1004 increments (+1) the variable i and updates the threshold value matrix to use. After the variable i is incremented, the processing returns to step 1105 and the threshold value th [i] is acquired from the threshold value matrix of the next level. In the case where the variable i has reached i_max, the processing advances to step 1110.

At step 1110, the output value Dout determined for the current pixel of interest is output from the comparison unit 1004. Here, in the image processing path 204Y for the Y plane, the number of levels of the threshold value matrix is "3" as described above, and therefore, unless some processing is performed, the output value Dout is a value of "0 to 3". Consequently, in order to make the range the same as the range "0 to 15" of the output value Dout in the other color planes, in the image processing path 204Y for the Y plane, the output value Dout is quintuplicated in the output conversion unit 1005Y and then the value is output.

The processing at each of step 1111 to step 1114 corresponds to the processing at each of step 508 to step 511 of the flow in FIG. 5 of the first embodiment. That is, in the case where the coordinate x in the main scanning direction has not reached x_max (No at step 1111), the coordinate x is incremented (step 1112) and the processing is continued for the next pixel of interest. On the other hand, in the case where the coordinate x in the main scanning direction has reached x_max (Yes at step 1111), whether the coordinate y in the sub scanning direction has reached y_max is determined (step 1113). Then, in the case where the coordinate y has not reached y_max (No at step 1113), after the coordinate x is reset, the coordinate y is incremented (step 1114) and the processing is continued for the next pixel of interest. In the case where the coordinate y has reached y_max (Yes at step 1113), this indicates that all the pixels of the input image data have been processed, and therefore, this processing is terminated.

The above is the contents of the halftone processing performed in each image processing path according to the present embodiment. In the present embodiment, explanation is given by taking the halftone processing to generate a multivalued image of 16 tone levels as an example, but it is also possible to apply the present embodiment in the case of performing quantization to generate a multivalued image of four tone levels or eight tone levels. In the case of generating a multivalued image of four tone levels, the threshold value matrix whose number of levels is three (Level_1 to Level_3) is set. Then, in each image processing path, processing to compare the density value of the pixel of interest with the corresponding threshold value in the threshold value matrix of each level is repeated and a 2-bit value (one of ("00" to "11") values) obtained by adding up the comparison results is taken to be the output value. In the case of the threshold value matrix whose one level has a size of M=20 and N=20, it is possible to have a total of 400×3=1,200 threshold values for Level_1 to Level_3. The number 1,200 is a sufficient number in the case where the K plane whose lightness difference is "65" is represented by 1,024 tone levels. Based on this, the gradation number necessary for the Y plane whose lightness difference is "10" is 160, and therefore, in the case of the threshold value matrix whose one level has a size of M=20 and N=20, it is possible to have 400 threshold values in the threshold value matrix whose number of levels is "1", that is, in one threshold value matrix, and therefore, sufficiently capable of representation. That is, in the case of generating a multivalued image of four tone levels, three threshold value matrixes are used for each of the K plane, the C plane, and the M plane, but for the Y plane, it is only necessary to use one threshold value matrix.

Further, it may also be possible to combine the contents of the first embodiment with the contents of the present embodiment described above. That is, it may also be possible to reduce the number of threshold value matrixes for the color plane whose visibility is low than the number of threshold value matrixes for the other color planes and then to further reduce the number of bits thereof than the number of bits of the threshold value in the other color planes. For example, in the above-described example, in the threshold value matrix for the Y plane whose visual recognizability is low, 240 threshold values are prepared. Here, the necessary number of bits of the threshold value in the case where the K plane is represented by 1,024 tone levels is "10". That is, the value each threshold value can take is "0 to 1,023". However, for the Y plane, it is only necessary to represent 160 tone levels, and therefore, in order to prepare different values for the 240 threshold values, it is only necessary to prepare eight bits (0 to 255). Consequently, the amount of memory necessary to store the threshold value matrix for the Y plane in the matrix storage unit 1002Y is only M×M×3 (levels)×8 (bits). Then, in this case, compared to the conventional case, it is made possible to reduce the amount of memory necessary to store the threshold value matrix for the Y plane by 84%.

According to the present embodiment, in the case of performing quantization to generate a multivalued image by comparing with a plurality of different threshold values for one pixel, the number of threshold value matrixes for a color plane whose visual recognizability is low is made smaller than the number of threshold value matrixes for the other color planes. Due to this, it is made possible to reduce the circuit scale while maintaining necessary gradation properties.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, in the case of performing halftone processing using a threshold value matrix, it is possible to reduce the memory capacity for storing the threshold value matrix without reducing the image quality of an output image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-113491, filed Jun. 8, 2017, which is hereby incorporated by reference wherein in its entirety.

What is claimed is:

1. An image processing apparatus that generates a halftone image by performing halftone processing using a threshold value matrix for each piece of image data of a plurality of color planes corresponding to color materials used for printing processing, wherein
a number of bits of a threshold value in a first threshold value matrix for a color plane whose visibility is relatively low of the plurality of color planes is smaller than a number of bits of a threshold value in a second threshold value matrix for a color plane whose visibility is relatively high of the plurality of color planes.

2. The image processing apparatus according to claim 1, wherein
a number of bits of a threshold value in the first and second threshold value matrixes is determined based on a difference between lightness of each color plane and lightness of a printing medium used for the printing processing.

3. The image processing apparatus according to claim 2, wherein
a number of bits of a threshold value in the first and second threshold value matrixes is determined based on a gradation number of a color plane whose visibility is the highest of the plurality of color planes so that a gradation number for a lightness difference of 1 in the plurality of color planes is the same for each color plane.

4. The image processing apparatus according to claim 3, wherein
the plurality of color planes includes at least a black plane, and
the color plane whose visibility is the highest is the black plane.

5. The image processing apparatus according to claim 1, wherein
the plurality of color planes includes at least a yellow plane, and
the color plane whose visibility is relatively low is the yellow plane.

6. The image processing apparatus according to claim 1, wherein
the plurality of color planes includes at least a light cyan plane and a light magenta plane, and
the color plane whose visibility is relatively low is the light cyan plane and the light magenta plane.

7. An image processing method of generating a halftone image by performing halftone processing using a threshold value matrix for each piece of image data of a plurality of color planes corresponding to color materials used for printing processing, the image processing method comprising:
performing, for image data of a color plane whose visibility is relatively low of the plurality of color planes, the halftone processing by using a threshold value matrix whose number of bits of a held threshold value is smaller than that for image data of a color plane whose visibility is relatively high of the plurality of color plane.

8. An image processing apparatus that applies a first dither matrix to a first color plane of image data and a second dither matrix to a second color plane of the image data,
 wherein a visibility of the first color is lower than a visibility of the second color,
 wherein a number of bits of each threshold value in the first dither matrix is lower than a number of bits of each threshold value in the second dither matrix.

9. The image processing apparatus according to claim 8, wherein the image processing apparatus applies a plurality of dither matrixes including the first dither matrix to the second color plane of the image data, but does not apply a plurality of dither matrixes to the first color plane of the image data.

10. The image processing apparatus according to claim 9, wherein the plurality of dither matrixes including the first dither matrix is applied to a same area in the second color plane of the image data.

11. The image processing apparatus according to claim 8, wherein a first number of dither matrixes applied to the second color plane of the image data is higher than a second number of dither matrixes applied to the first color plane of the image data.

\* \* \* \* \*